(12) United States Patent
Hu

(10) Patent No.: US 10,229,332 B2
(45) Date of Patent: Mar. 12, 2019

(54) METHOD AND APPARATUS FOR RECOGNIZING OBSTACLE OF VEHICLE

(71) Applicant: BAIDU ONLINE NETWORK TECHNOLOGY (BEIJING) CO., LTD., Beijing (CN)

(72) Inventor: Taiqun Hu, Beijing (CN)

(73) Assignee: Baidu Online Network Technology (Beijing) Co., Ltd., Beijing (CN)

(*) Notice: Subject to any disclaimer, the term of this patent is extended or adjusted under 35 U.S.C. 154(b) by 33 days.

(21) Appl. No.: 15/605,810

(22) Filed: May 25, 2017

(65) Prior Publication Data

US 2018/0157920 A1 Jun. 7, 2018

(30) Foreign Application Priority Data

Dec. 1, 2016 (CN) .......................... 2016 1 1088130

(51) Int. Cl.
| | | |
|---|---|---|
| G06K 9/00 | (2006.01) | |
| G06K 9/62 | (2006.01) | |
| G06T 7/70 | (2017.01) | |
| G01S 7/497 | (2006.01) | |
| G01S 17/02 | (2006.01) | |
| B60R 1/00 | (2006.01) | |

(52) U.S. Cl.
CPC ............ G06K 9/00805 (2013.01); B60R 1/00 (2013.01); G01S 7/497 (2013.01); G01S 17/023 (2013.01); G06K 9/6202 (2013.01); G06K 9/6215 (2013.01); G06K 9/6267 (2013.01); G06T 7/70 (2017.01); B60K 2350/106 (2013.01); B60K 2350/2013 (2013.01); B60K 2350/2047 (2013.01); B60R 2300/301 (2013.01); B60R 2300/8093 (2013.01); G06T 2207/10028 (2013.01)

(58) Field of Classification Search
CPC .... G06K 9/00805; G06K 9/6202; G06T 7/70; B60R 1/00; G01S 7/497; G01S 17/023
USPC .......................................................... 348/42
See application file for complete search history.

(56) References Cited

U.S. PATENT DOCUMENTS

2014/0369168 A1* 12/2014 Max ...................... G01S 15/878
367/93
2018/0225515 A1 8/2018 Jiang et al.

FOREIGN PATENT DOCUMENTS

| CN | 103577792 | 2/2014 |
|---|---|---|
| CN | 105184852 | 12/2015 |

* cited by examiner

*Primary Examiner* — Nguyen T Truong
(74) *Attorney, Agent, or Firm* — Knobbe, Martens, Olson & Bear, LLP

(57) ABSTRACT

The present disclosure discloses a method and an apparatus for recognizing an obstacle to a vehicle. The method comprises: acquiring point cloud data of a target region by a lidar sensor and acquiring image data of the target region by using an image capturing apparatus; recognizing obstacle information in the point cloud data by a preset point cloud recognition model, and labeling a recognition result to obtain a first labeled result; recognizing obstacle information in the image data by a preset image recognition model, and labeling a recognition result to obtain a second labeled result; comparing the first labeled result with the second labeled result to decide whether the first and the second labeled result are identical; and determining a correct labeled result from the first and the second labeled result in response to the first and the second labeled result being not identical and outputting the correct labeled result.

17 Claims, 6 Drawing Sheets

METHOD AND APPARATUS FOR RECOGNIZING OBSTACLE OF VEHICLE

CROSS-REFERENCE TO RELATED APPLICATION

This application is related to and claims priority from Chinese Patent Application No. 201611088130.0, filed on Dec. 1, 2016, entitled "Method and Apparatus for Recognizing Obstacle Of Vehicle," the entire disclosure of which is hereby incorporated by reference for all purposes.

TECHNICAL FIELD

The present disclosure relates to the field of computer technologies, particularly to the field of obstacle recognition, and more particularly, to a method and an apparatus for recognizing an obstacle to a vehicle.

BACKGROUND

Correct recognition of obstacles is of great significance to unmanned vehicles and autonomous driving modes of vehicles. When implementing automatic recognition of the obstacles, lidar sensors, millimeter-wave lidar sensors or image capturing apparatuses are generally installed on the vehicles to gather obstacle information around the vehicles to obtain three-dimensional point cloud data or two-dimensional image data. Next, the obstacles in the three-dimensional point cloud data or the two-dimensional image data are recognized by utilizing trained machine learning algorithms. When training the machine learning algorithms, generally the three-dimensional point cloud data or the two-dimensional image data in which the obstacles have been labeled are utilized to train the machine learning algorithms.

Existing labeling methods mainly utilize a manually labeling manner, which not only consumes manpower and financial resources, but also reduces the labeling efficiency.

SUMMARY

An objective of the present disclosure is to provide a method and an apparatus for recognizing an obstacle to a vehicle, in order to solve the technical problem mentioned in the foregoing background section.

In a first aspect, the present disclosure provides a method for recognizing an obstacle to a vehicle. The vehicle comprises a calibrated lidar sensor and an image capturing apparatus. The method comprises: acquiring point cloud data of a target region by using the lidar sensor and acquiring image data of the target region by using the image capturing apparatus; recognizing obstacle information in the point cloud data by using a preset point cloud recognition model, and labeling a recognition result to obtain a first labeled result; recognizing obstacle information in the image data by using a preset image recognition model, and labeling a recognition result to obtain a second labeled result; comparing the first labeled result with the second labeled result to decide whether the first labeled result and the second labeled result are identical; and in response to deciding that the first labeled result and the second labeled result are not identical, determining a correct labeled result from the first labeled result and the second labeled result and outputting the correct labeled result.

In some embodiments, the determining a correct labeled result from the first labeled result and the second labeled result comprises: determining a difference between the first labeled result and the second labeled result; determining a first obstacle in the first labeled result indicated by the difference and a second obstacle in the second labeled result indicated by the difference; determining a labeled volume determined by a three-dimensional coordinate set of the first obstacle and a first distance between the first obstacle and the lidar sensor in the first labeled result; determining an expected volume range of the first obstacle in the point cloud data based on the first labeled result and the first distance; and in response to the labeled volume being beyond the expected volume range, determining the first labeled result as being incorrect.

In some embodiments, the determining a correct labeled result from the first labeled result and the second labeled result comprises: determining a labeled pixel area covered by the second obstacle in the second labeled result; determining a second distance between the second obstacle and the image capturing apparatus based on the first distance, and a calibration parameter between the lidar sensor and the image capturing apparatus; determining an expected pixel area range of the second obstacle in the image data based on the second labeled result and the second distance; and in response to the labeled pixel area being beyond the expected pixel area range, determining the second labeled result as being incorrect.

In some embodiments, the determining a correct labeled result from the first labeled result and the second labeled result comprises: in response to the labeled volume being within the expected volume range and the labeled pixel area being within the expected pixel area range, performing following steps: determining an actual volume determined by the three-dimensional coordinate set of the first obstacle in the point cloud data; projecting the actual volume into the image data to obtain an expected pixel area corresponding to the actual volume; deciding whether the labeled pixel area is equal to the expected pixel area; and determining the first labeled result as being correct when deciding that the labeled pixel area is not equal to the expected pixel area.

In some embodiments, the determining a correct labeled result from the first labeled result and the second labeled result comprises: determining the second labeled result as being correct when deciding that the second pixel area is equal to the expected pixel area.

In some embodiments, the determining a correct labeled result from the first labeled result and the second labeled result comprises: deciding whether the labeled volume is equal to the actual volume; and determining the first labeled result as being correct when deciding that the labeled volume is equal to the actual volume.

In some embodiments, the determining a correct labeled result from the first labeled result and the second labeled result comprises: determining the second labeled result as being correct when deciding that the labeled volume is not equal to the actual volume.

In some embodiments, the method further comprises at least one of: in response to the first labeled result being correct, revising the second labeled result based on the first labeled result and retraining the image recognition model by using the revised second labeled result; and in response to the second labeled result being correct, revising the first labeled result based on the second labeled result and retraining the point cloud recognition model by using the revised first labeled result.

In a second aspect, the present disclosure provides an apparatus for recognizing an obstacle to a vehicle. The vehicle comprises a calibrated lidar sensor and an image capturing apparatus. The apparatus comprises: an acquiring unit, configured to acquire point cloud data of a target region by using the lidar sensor and acquire image data of the target region by using the image capturing apparatus; a first labeling unit, configured to recognize obstacle information in the point cloud data by using a preset point cloud recognition model, and label a recognition result to obtain a first labeled result; a second labeling unit, configured to recognize obstacle information in the image data by using a preset image recognition model, and label a recognition result to obtain a second labeled result; a deciding unit, configured to decide whether the first labeled result and the second labeled result are identical by comparing the first labeled result with the second labeled result; and an outputting unit, configured to, in response to deciding that the first labeled result and the second labeled result are not identical, determine a correct labeled result from the first labeled result and the second labeled result.

In some embodiments, the outputting unit comprises: a first determining module, configured to determine a difference between the first labeled result and the second labeled result; an obstacle determining module, configured to determine a first obstacle in the first labeled result indicated by the difference and a second obstacle in the second labeled result indicated by the difference; a labeled volume determining module, configured to determine a labeled volume determined by a three-dimensional coordinate set of the first obstacle and a first distance between the first obstacle and the lidar sensor in the first labeled result; an expected volume range determining module, configured to determine an expected volume range of the first obstacle in the point cloud data based on the first labeled result and the first distance; and a first result determining module, configured to, in response to the labeled volume being beyond the expected volume range, determine the first labeled result as being incorrect.

In some embodiments, the outputting unit comprises: a labeled pixel area determining module, configured to determine a labeled pixel area covered by the second obstacle in the second labeled result; a second distance determining module, configured to determine a second distance between the second obstacle and the image capturing apparatus based on the first distance, and a calibration parameter between the lidar sensor and the image capturing apparatus; an expected pixel area range determining module, configured to determine an expected pixel area range of the second obstacle in the image data based on the second labeled result and the second distance; and a second result determining module, configured to, in response to the labeled pixel area being beyond the expected pixel area range, determine the second labeled result as being incorrect.

In some embodiments, the outputting unit comprises: a second determining module, configured to, in response to the labeled volume being within the expected volume range and the labeled pixel area being within the expected pixel area range, perform following steps: determining an actual volume determined by the three-dimensional coordinate set of the first obstacle in the point cloud data; projecting the actual volume into the image data to obtain an expected pixel area corresponding to the actual volume; deciding whether the labeled pixel area is equal to the expected pixel area; and determining the first labeled result as being correct when deciding that the labeled pixel area is not equal to the expected pixel area.

In some embodiments, the second determining module is further configured to: determine the second labeled result as being correct when deciding that the second pixel area is equal to the expected pixel area.

In some embodiments, the second determining module is further configured to: decide whether the labeled volume is equal to the actual volume; and determine the first labeled result as being correct when deciding that the labeled volume is equal to the actual volume.

In some embodiments, the second determining module is further configured to: determine the second labeled result as being correct when deciding that the labeled volume is not equal to the actual volume.

In some embodiments, the apparatus further comprises at least one of: a first revising unit, configured to, in response to the first labeled result being correct, revise the second labeled result based on the first labeled result and retrain the image recognition model by using the revised second labeled result; and a second revising unit, configured to, in response to the second labeled result being correct, revise the first labeled result based on the second labeled result and retrain the point cloud recognition model by using the revised first labeled result.

According to the method and apparatus for recognizing an obstacle to a vehicle provided by the present disclosure, point cloud data of a target region are acquired by using a lidar sensor, image data of the target region are acquired by using an image capturing apparatus, then obstacles in the point cloud data are recognized by using a preset point cloud recognition model, obstacles in the image data are recognized by using a preset image recognition model, the recognized obstacles are respectively labeled to obtain a first labeled result and a second labeled result, then the first labeled result is compared with the second labeled result, the correct one is determined when the two labeled results are different, and then the correct labeled result is outputted. The method of the present disclosure not only implements rapidly and accurately recognizing the correct labeled result, but also does not need to manually label in the whole process, thereby effectively improving the labeling efficiency.

BRIEF DESCRIPTION OF THE DRAWINGS

By reading the detailed description of non-limiting embodiments with reference to the following accompanying drawings, other features, objectives and advantages of this application will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
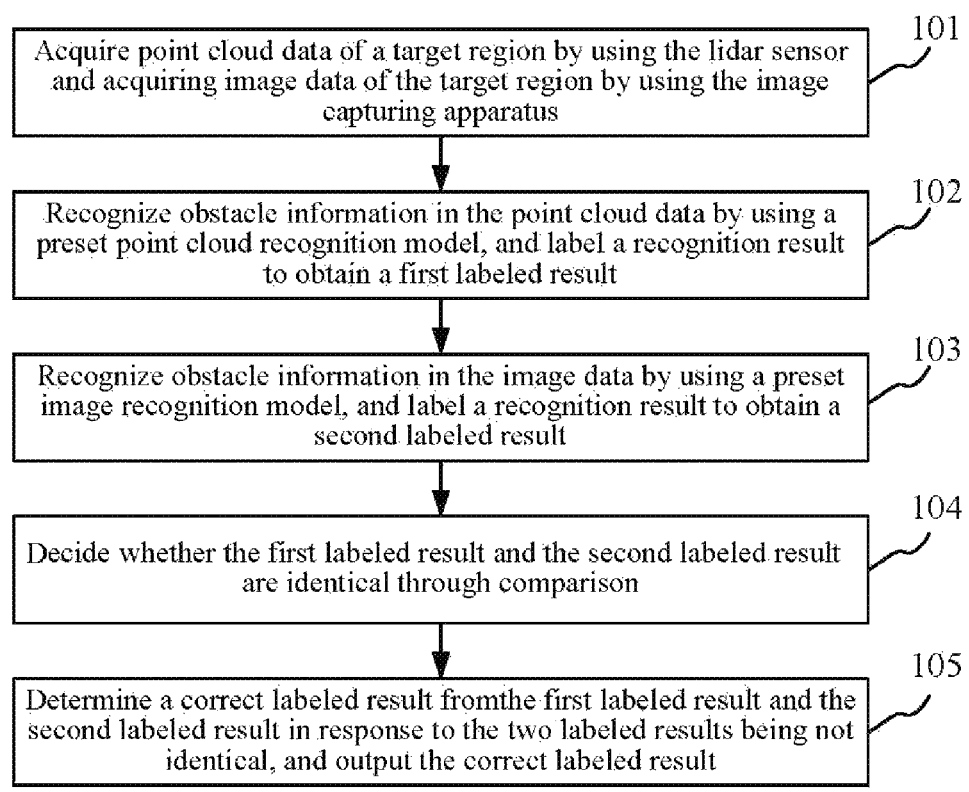
FIG. 1 is a flowchart of a method for recognizing an obstacle to a vehicle according to an embodiment of the present disclosure.

Referring to FIG. 1, which illustrates a flowchart 100 of a method for recognizing an obstacle to a vehicle according to an embodiment of the present disclosure. The vehicle of this embodiment comprises a lidar sensor and an image capturing apparatus, wherein the lidar sensor is configured to acquire point cloud data, the image capturing apparatus is configured to acquire image data, and both the lidar sensor and the image capturing apparatus have been calibrated. When the lidar sensor and the image capturing apparatus are calibrated, a reference object such as a cylinder may be placed within a common view of the lidar sensor and the image capturing apparatus. Point cloud data and image data of the reference object in different positions are acquired. Calibration is implemented by adjusting internal and external parameters of the lidar sensor and the image capturing apparatus. It is to be understood that the vehicle of this embodiment may comprise a plurality of lidar sensors and a plurality of image capturing apparatuses. This embodiment does not limit the number of the lidar sensors and the image capturing apparatuses. Those skilled in the art may set the number of the lidar sensors and the image capturing apparatuses according to practical application situations.

The method for recognizing an obstacle to a vehicle in this embodiment comprises following steps.

Step 101: acquiring point cloud data of a target region by using the lidar sensor and acquiring image data of the target region by using the image capturing apparatus.

In this embodiment, an electronic device (such as an electronic control unit or a vehicle terminal) on which the method for recognizing an obstacle to a vehicle runs may control the lidar sensor and the image capturing apparatus by means of wired connection or wireless connection. Specifically, the electronic control unit or the vehicle terminal may control the lidar sensor to gather the point cloud data of a certain region at a certain frequency, and may control the image capturing apparatus to gather the image data of the same region at the same frequency. The target region may be a region of a to-be-detected obstacle. It is to be understood that the target region should be positioned within the common view of the lidar sensor and the image capturing apparatus.

It should be noted that the above wireless connection manner may comprise but not limited to 3G/4G connection, WiFi connection, Bluetooth connection, WiMAX connection, Zigbee connection, ultra wideband (UWB) connection and other present known or future developed wireless connection manners.

Step 102: recognizing obstacle information in the point cloud data by using a preset point cloud recognition model, and labeling a recognition result to obtain a first labeled result.

In this embodiment, the preset point cloud recognition model may be various pre-trained algorithms capable of recognizing obstacles in the point cloud data, for example, an iterative closest point (ICP) algorithm or a random forests algorithm. After recognizing the obstacles in the point cloud data by using the point cloud recognition model, the recognized obstacles are labeled to obtain the first labeled result. When labeling the recognized obstacles, the labeled shape may be a smallest cuboid externally tangent to each obstacle, or may be an irregular curved surface adjacent to an external surface of each obstacle. It is to be understood that the first labeled result comprises a recognition result of each obstacle. For example, when the point cloud data comprise vehicles, pedestrians and trees, the first labeled result also comprises mark numbers or letters representing different obstacles, for example, 1 represents the vehicles, 2 represents the pedestrians, and 3 represents the trees.

Step 103: recognizing obstacle information in the image data by using a preset image recognition model, and labeling a recognition result to obtain a second labeled result.

In this embodiment, the preset image recognition model may be various pre-trained algorithms capable of recognizing obstacles in the image data, for example, a convolutional neural network. After recognizing obstacles in the image data by using the image recognition model, the obstacles may be labeled by using minimal circumscribed rectangles or boundaries of the obstacles to obtain the second labeled result. It is to be understood that the second labeled result comprises a recognition result of each obstacle. For example, when the image data comprise vehicles, pedestrians and trees, the second labeled result also comprises mark numbers or letters representing different obstacles, for example, 1 represents the vehicles, 2 represents the pedestrians, and 3 represents the trees.

Step 104: deciding whether the first labeled result and the second labeled result are identical through comparison.

After recognizing and labeling the obstacles in the point cloud data by using the point cloud recognition model and recognizing and labeling the obstacles in the image data by using the image recognition model, a comparison may be made on the two labeled results to decide whether the two labeled results are identical.

Step 105: determining a correct labeled result in the first labeled result and the second labeled result in response to the two labeled results being different, and outputting the correct labeled result.

In this embodiment, the electronic control unit or the vehicle terminal may determine, by using various methods, the correct labeled result in the first labeled result and the second labeled result. For example, the electronic control unit or the vehicle terminal may send the acquired point cloud data or image data to a plurality of manually-labeled terminals, determine a manually-labeled result as a standard, and then respectively compare the first labeled result and the second labeled result with the manually-labeled result. In this way, the correct labeled result in the first labeled result and the second labeled result may be determined. Alternatively, the electronic control unit or the vehicle terminal recognizes the obstacles in the point cloud data and the image data using other algorithms, then respectively compares with the first labeled result and the second labeled result. In this way, the correct labeled result in the first labeled result and the second labeled result may be determined. After determining the correct labeled result, the electronic control unit or the vehicle terminal may output the correct labeled result.

Figure 2:
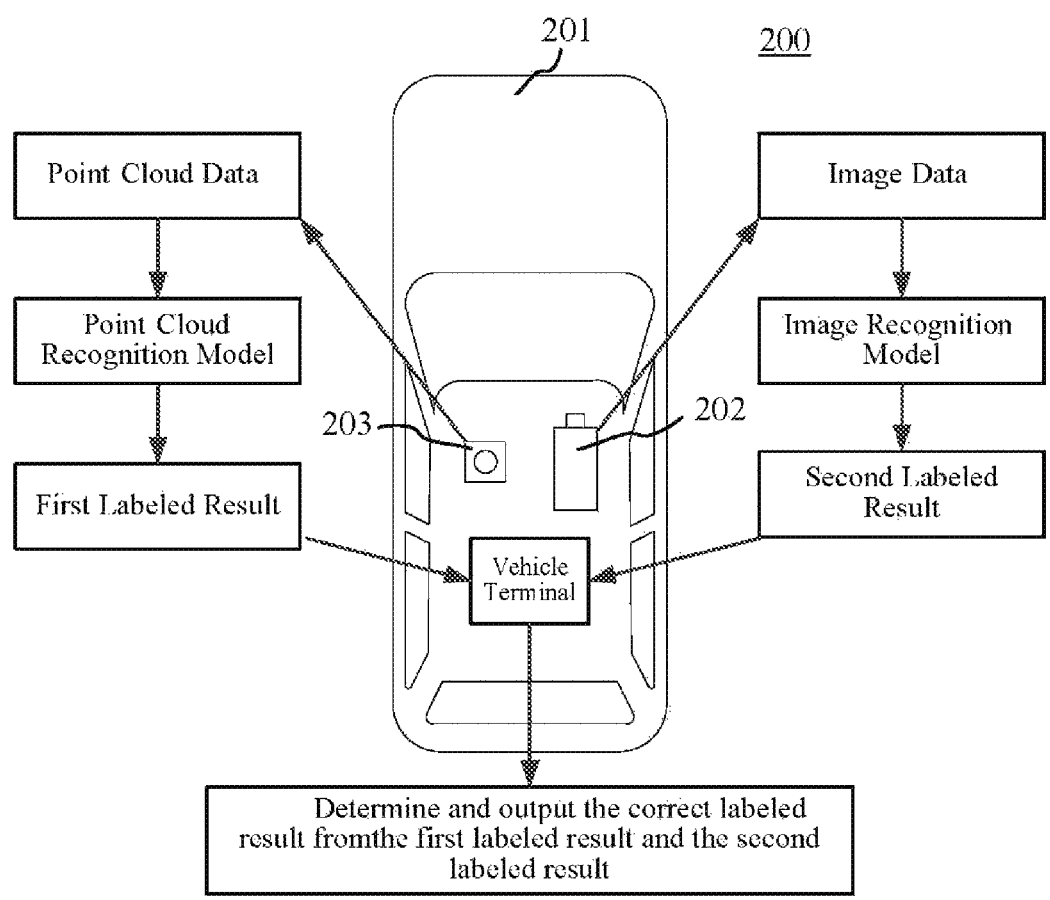
FIG. 2 is a schematic diagram of an application scenario of the method for recognizing an obstacle to a vehicle according to the present disclosure.

Continuing referring to FIG. 2, which is a schematic diagram of an application scenario of the method for recognizing an obstacle to a vehicle according to this embodiment. In the application scenario of FIG. 2, the vehicle 201 is provided with a camera 202, a lidar sensor 203 and a vehicle terminal 204. The camera 202 gathers the image data in front of the vehicle 201, and the lidar sensor 203 gathers the point cloud data in front of the vehicle 201. The first labeled result is obtained after the point cloud data are recognized and labeled by the point cloud recognition model, and the second labeled result is obtained after the image data are recognized and labeled by the image recognition model. The vehicle terminal 204 determines and outputs the correct labeled result in the first labeled result and the second labeled result.

According to the method for recognizing an obstacle to a vehicle provided by the embodiments of the present disclosure, point cloud data of a target region are acquired by using a lidar sensor, image data of the target region are acquired by using an image capturing apparatus, then obstacles in the point cloud data are recognized by using a preset point cloud recognition model, obstacles in the image data are recognized by using a preset image recognition model, the recognized obstacles are respectively labeled to obtain a first labeled result and a second labeled result, then the first labeled result is compared with the second labeled result, the correct one is determined when the two labeled results are different, and then the correct labeled result is outputted. The method of the present disclosure not only implements rapidly and accurately recognizing the correct labeled result, but also does not need to manually label in the whole process, thereby effectively improving the labeling efficiency.

In some optional implementations of this embodiment, the method for recognizing an obstacle to a vehicle may further comprise at least one (not shown in FIG. 1) of:

revising the second labeled result based on the first labeled result in response to the first labeled result being correct, and utilizing the revised second labeled result to retrain the image recognition model; and revising the first labeled result based on the second labeled result in response to the second labeled result being correct, and using the revised first labeled result to retrain the point cloud recognition model.

In this implementation, after the correct labeled result is detected, an inaccurate labeled result may be revised based on the correct labeled result, and then a model of the inaccurate labeled result is obtained by retraining the revised labeled result. In this way, the accuracy rate of the labeled result of the image recognition model or the point cloud recognition model may be continuously increased, and the upgrade of the image recognition model or the point cloud recognition model is implemented.

Figure 3:
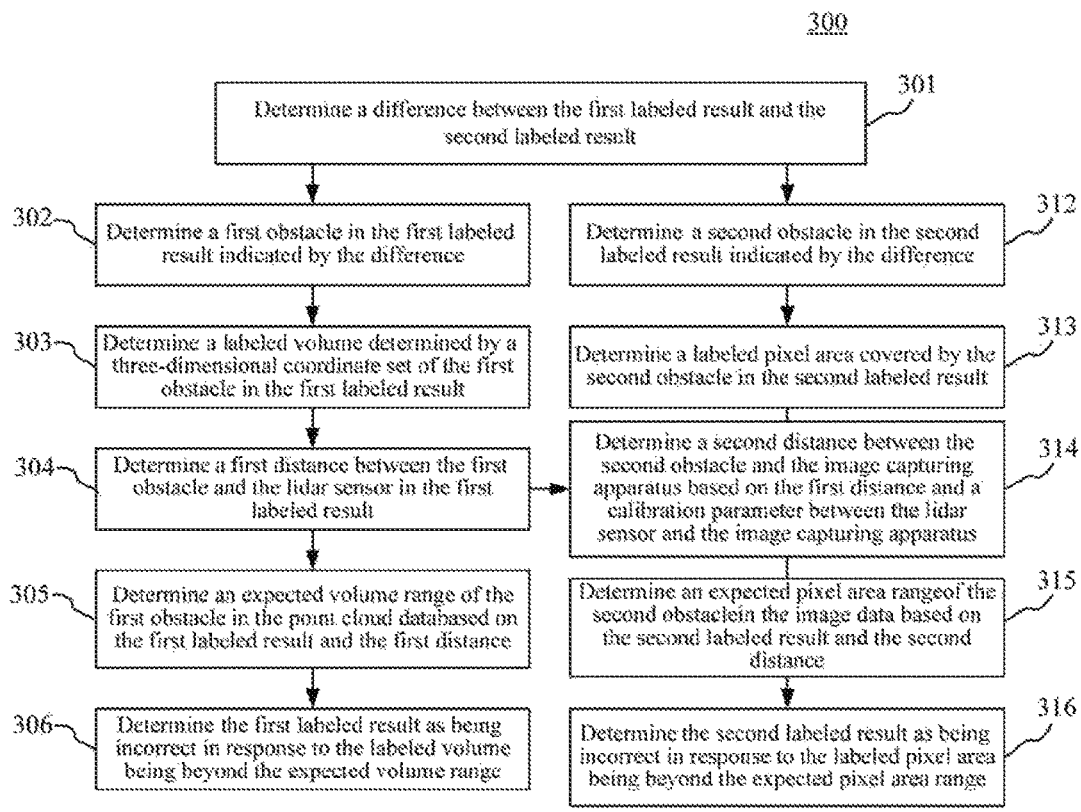
FIG. 3 is a flowchart of a method for determining a correct labeled result in a first labeled result and a second labeled result in the method for recognizing an obstacle to a vehicle according to an embodiment of the present disclosure.

FIG. 3 illustrates a flowchart 300 of a method for determining the correct labeled result in the first labeled result and the second labeled result in the method for recognizing an obstacle to a vehicle according to an embodiment of the present disclosure. The method for determining the correct labeled result in the first labeled result and the second labeled result of this embodiment comprises following steps.

Step 301: determining a difference between the first labeled result and the second labeled result.

When the electronic control unit or the vehicle terminal compares the first labeled result with the second labeled result and detects a difference between the two labeled results, the difference between the two labeled results is first determined. The difference may comprise: a difference of the number of the labeled obstacles, and a difference of the labeled results of the same obstacle. Specifically, the difference of the number of the labeled obstacles may be embodied as the point cloud recognition model or the image recognition model not recognizing a certain obstacle. The difference of the labeled results of the same obstacle may be embodied as the labeled result of a certain obstacle by the point cloud recognition model being a vehicle and the labeled result of the obstacle by the image recognition model being a pedestrian.

Step 302: determining a first obstacle indicated in the first labeled result by the difference.

The first obstacle indicated in the first labeled result is determined based on the difference. Taking the labeled results of the same obstacle being different as an example, the first obstacle in the first labeled result and a second obstacle in the second labeled result indicated by the same difference are a vehicle and a pedestrian respectively.

Step 303: determining a labeled volume determined by a three-dimensional coordinate set of the first obstacle in the first labeled result.

The three-dimensional coordinate of each obstacle may be determined in the point cloud data. Therefore, the volume of each obstacle may be determined based on the three-dimensional coordinate of each obstacle. The labeled volume of each obstacle may be determined in the first labeled result.

Step 304: determining a first distance between the first obstacle and the lidar sensor in the first labeled result.

Because the point cloud data comprise the three-dimensional coordinate of each obstacle, the first distance between the first obstacle and the lidar sensor may be determined based on the three-dimensional coordinate of each obstacle and an installation site of the lidar sensor. It is to be understood that when determining the first distance, a distance between each three-dimensional coordinate of the first obstacle and the lidar sensor may be first calculated, then an average value of the distances is calculated, and the average value is determined as the first distance between the first obstacle and the lidar sensor. Also the minimum distance among the distances obtained by calculation may be selected as the first distance.

Step 305: determining, based on the first labeled result and the first distance, an expected volume range, in the point cloud data, of the first obstacle.

The electronic control unit or the vehicle terminal may calculate an appropriate volume range of the first obstacle in combination with the first distance between the first obstacle and the lidar sensor based on labeling the first obstacle in the first labeled result. Taking the first obstacle being a compact car as an example, supposing the distance from the compact car to the lidar sensor is $l_1$ m, in view of compact cars of different vehicle types being different in size, the electronic control unit or the vehicle terminal may calculate that the volume of the compact car should be between $V_1$ m$^3$ and $V_2$ m$^3$, and the expected volume range is from $V_1$ m$^3$ to $V_2$ m$^3$.

Step 306: determining the first labeled result as being incorrect in response to the labeled volume being beyond the expected volume range.

When the labeled volume of the first obstacle is beyond the expected volume range, the labeled result of the first obstacle is determined as being unreasonable, and the first labeled result is determined as being inaccurate.

Meanwhile, after Step 301, the electronic control unit or the vehicle terminal may also perform Step 312.

Step 312: determining a second obstacle in the second labeled result indicated by the difference.

Taking the labeled results of the same obstacle being different as an example, the first obstacle in the first labeled result and a second obstacle in the second labeled result indicated by the same difference are a vehicle and a pedestrian respectively.

Step 313: determining a labeled pixel area, covered by the second obstacle, in the second labeled result.

Each obstacle in the image data should cover a certain pixel area. In this embodiment, the labeled pixel area covered by the range comprised in the labeling box of each obstacle is determined. The labeled pixel area may be represented by a numerical value, or may be represented in the form of length multiplied by width. For example, when the labeling box is a rectangular box, the labeled pixel area may be 900 or 30×30.

Step 314: determining a second distance between the second obstacle and the image capturing apparatus based on the first distance and a calibration parameter between the lidar sensor and the image capturing apparatus.

Both the lidar sensor and the image capturing apparatus have been calibrated. Therefore, a relative position (for example, a distance or an angle) between the lidar sensor and the image capturing apparatus may be determined based on the calibration parameter. Furthermore, the first distance between the same obstacle and the lidar sensor is known, so that the second distance between the second obstacle and the image capturing apparatus may be determined based on the first distance and the calibration parameter.

Step 315: determining, based on the second labeled result and the second distance, an expected pixel area range, in the image data, of the second obstacle.

The electronic control unit or the vehicle terminal may calculate an appropriate pixel area range of the second obstacle in combination with the second distance between the second obstacle and the image capturing apparatus based on labeling the second obstacle in the second labeled result. Taking the second obstacle being a pedestrian as an example, supposing the distance from the pedestrian to the image capturing apparatus is $l_1$ m, in view of different pedestrians being different in physique, the electronic control unit or the vehicle terminal may calculate that the pixel area of the pedestrian should be between $S_1$ and $S_2$, and the expected pixel area range is between $S_1$ and $S_2$.

Step 316: determining the second labeled result as being incorrect in response to the labeled pixel area being beyond the expected pixel area range.

When the labeled pixel area of the second obstacle is beyond the expected pixel area range, the labeled result of the second obstacle is determined as being unreasonable, and the second labeled result is determined as being inaccurate.

According to the method for recognizing an obstacle to a vehicle provided by the embodiments of the present disclosure, the first obstacle in the first labeled result and the second obstacle in the second labeled result indicated by the same difference are determined, then the first distance between the first obstacle and the lidar sensor and the second distance between the second obstacle and the image capturing apparatus are determined, the expected volume range and the expected pixel area range are respectively determined based on the distances and the labeled results, and then it is determined whether the first labeled result and the second labeled result are inaccurate. It may be determined whether the two labeled results are reasonable directly based on the labeled results, using less resources and processing at a higher speed.

Figure 4:
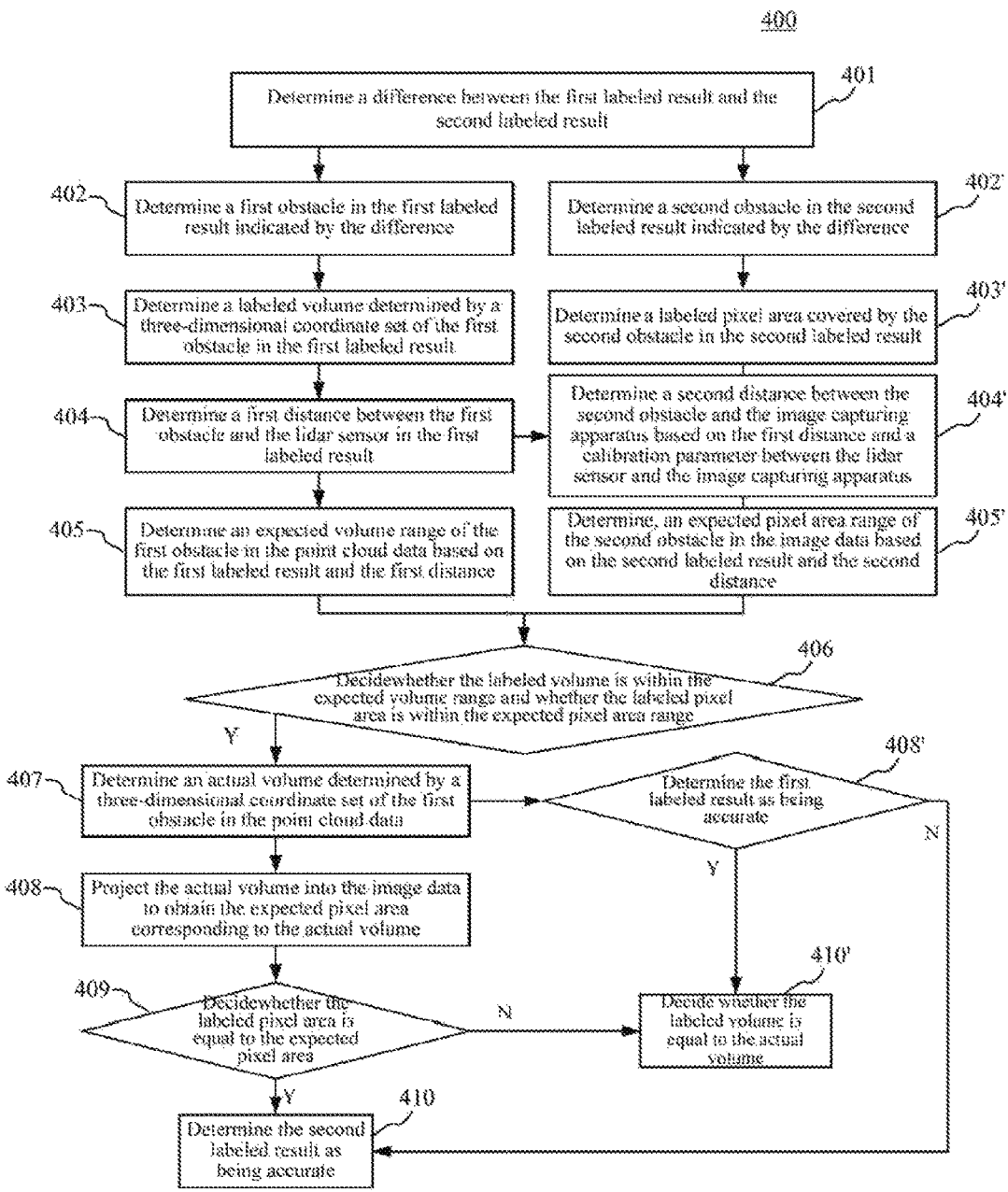
FIG. 4 is a flowchart of the method for determining the correct labeled result in the first labeled result and the second labeled result in the method for recognizing an obstacle to a vehicle according to another embodiment of the present disclosure.

FIG. 4 illustrates a flowchart 400 of the method for determining the correct labeled result in the first labeled result and the second labeled result in the method for recognizing an obstacle to a vehicle according to another embodiment of the present disclosure. The method for determining the correct labeled result in the first labeled result and the second labeled result of this embodiment comprises Steps 401~410. Steps 401~405 are identical to Steps 301~305 of the embodiment as shown in FIG. 3, and Steps 402'~405' are identical to Steps 311~315 of the embodiment as shown in FIG. 3, which are not repeated any more herein.

Step 406: deciding whether the labeled volume is within the expected volume range and whether the labeled pixel area is within the expected pixel area range.

Step 407 is performed when the above detection results are yes.

Step 407: determining an actual volume determined by a three-dimensional coordinate set of the first obstacle in the point cloud data.

In this embodiment, the electronic control unit or the vehicle terminal may determine actual three-dimensional data of the first obstacle directly based on the point cloud data acquired by the lidar sensor. In this way, the actual volume of the first obstacle may be determined.

Step 408: projecting the actual volume into the image data to obtain the expected pixel area corresponding to the actual volume.

In this embodiment, the electronic control unit or the vehicle terminal may perform dimension reducing processing on the three-dimensional volume (namely, the actual volume) occupied by the first obstacle in the point cloud data or perform projection processing on the image data to obtain the expected pixel area corresponding to the actual volume. It is to be understood that performing dimension reducing processing or performing projection processing on the image data needs to be in accordance with the calibration parameter between the lidar sensor and the image capturing apparatus.

Step 409: deciding whether the labeled pixel area is equal to the expected pixel area.

Step 410 is performed if the detection result is yes, otherwise Step 410' is performed.

Step 410: determining the second labeled result as being accurate.

When the labeled pixel area is equal to the expected pixel area, this indicates that the labeled result of the image recognition model and the pixel area covered by the labeled result are within a reasonable range. Meanwhile, when the projection, into the image data, of the actual volume of the obstacle in the original point cloud data gathered by the lidar sensor is equal to the labeled pixel area, the second labeled result obtained by the image recognition model is correct.

Step 410': determining the first labeled result as being accurate.

On the contrary, when the labeled pixel area is not equal to the expected pixel area, this indicates that although the labeled result of the image recognition model and the pixel area covered by the labeled result are within a reasonable range, they are different from the projection, into the image data, of the actual volume of the obstacle in the original point cloud data gathered by the lidar sensor and the labeled pixel area. In this case, the first labeled result obtained by the point cloud recognition model is determined as being correct.

For example, the point cloud data comprise a compact car, and the image data also comprise a compact car, but an error occurs when the image recognition model recognizes. The image recognition model fails in recognizing the compact car but recognizes the compact car as a pedestrian, and when labeling only a windscreen of the compact car is labeled. Therefore, the labeled pixel area covered by the obtained labeling box is within the expected pixel area range.

After the electronic control unit or the vehicle terminal performs Step 407 and Step 408, the obtained expected pixel area is the pixel area covered by the whole compact car in the image data, which is larger than the labeled pixel area. In this case, the second labeled result obtained by the image recognition model is determined as being inaccurate.

Meanwhile, in this embodiment, Step 408' may be performed after Step 407 to implement determination of the first labeled result and the second labeled result.

Step 408': deciding whether the labeled volume is equal to the actual volume.

After obtaining the actual volume of the first obstacle in the point cloud data, the actual volume may be directly compared with the labeled volume to decide whether they are equal. Step 410' is performed when the actual volume is equal to the labeled volume, otherwise Step 410 is performed.

In some optional implementations of this embodiment, when the difference between the first labeled result and the second labeled result resides in that for a certain obstacle, one of the point cloud recognition model and the image recognition model labels the obstacle but the other one does not label the obstacle, the correct labeled result in the first labeled result and the second labeled result may be determined through the following steps:

comparing the first labeled result with the second labeled result to determine each obstacle omitted to be labeled in the first labeled result or the second labeled result; for each obstacle omitted to be labeled, deciding whether the point cloud data of the obstacle omitted to be labeled are present in the point cloud data; and determining the labeled result of the obstacle omitted to be labeled as being inaccurate when the point cloud data are present.

This implementation may quickly detect each obstacle omitted to be labeled in the first labeled result and the second labeled result, thereby improving efficiency of determining the correct labeled result.

In some optional implementations of this embodiment, when it is detected that the first labeled result and the second labeled result are identical, this indicates that either the two labeled results are correct or the same label error occur. In this case, the electronic control unit or the vehicle terminal may randomly select, from the first labeled result or the second labeled result, a plurality of obstacles for verification and detection. It is determined whether the first labeled result and the second labeled result are correct based on the verification and detection results.

In this implementation, when conducting the verification and detection, Steps 403~410 may be performed to determine whether labels of the selected obstacles are correct.

In some optional implementations of this embodiment, when it is detected that both the first labeled result and the second labeled result are correct, a "credible" label may be respectively set for the first labeled result and the second labeled result, then the first labeled result and the second labeled result are stored so that subsequently the two labeled results are utilized to train other recognition models.

Compared with the embodiment as shown in FIG. 3, the method for recognizing an obstacle to a vehicle provided by the above embodiment of the present disclosure effectively improves accuracy of detecting two labeled results.

Figure 5:
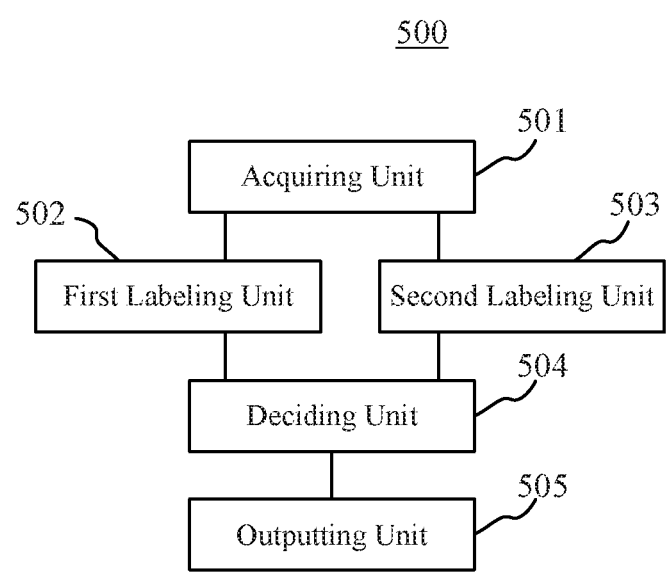
FIG. 5 is a schematic structural diagram of an apparatus for recognizing an obstacle to a vehicle according to an embodiment of the present disclosure.

Further referring to FIG. 5, as an implementation of the method as shown in the foregoing figures, the present disclosure provides an embodiment of an apparatus for recognizing an obstacle to a vehicle. The apparatus embodiment corresponds to the method embodiment as shown in FIG. 1, and the apparatus specifically may be used in various electronic devices. The vehicle of this embodiment comprises a calibrated lidar sensor and an image capturing apparatus.

As shown in FIG. 5, the apparatus 500 for recognizing an obstacle to a vehicle of this embodiment comprises: an acquiring unit 501, a first labeling unit 502, a second labeling unit 503, a deciding unit 504 and an outputting unit 505.

The acquiring unit 501 is configured to acquire point cloud data of a target region by using the lidar sensor and acquire image data of the target region by using the image capturing apparatus.

The first labeling unit 502 is configured to recognize, by using a preset point cloud recognition model, obstacle information, in the point cloud data, acquired by the acquiring unit 501, and label a recognition result to obtain a first labeled result.

The second labeling unit 503 is configured to recognize, by using a preset image recognition model, obstacle information, in the image data, acquired by the acquiring unit 501, and label a recognition result to obtain a second labeled result.

The deciding unit 504 is configured to decide whether the first labeled result obtained by the first labeling unit 502 and the second labeled result obtained by the second labeling unit 503 are identical through comparison.

The outputting unit 505 is configured to determine a correct labeled result in the first labeled result and the second labeled result in response to the first labeled result being different from the second labeled result and output the correct labeled result.

According to the apparatus for recognizing an obstacle to a vehicle provided by the above embodiment of the present disclosure, the acquiring unit acquires point cloud data of a target region by using a lidar sensor, and acquires image data of the target region by using an image capturing apparatus. Next, the first labeling unit recognizes an obstacle in the point cloud data by using a preset point cloud recognition model, the second labeling unit recognizes an obstacle in the image data by using a preset image recognition model, and recognized obstacles are respectively labeled to obtain a first labeled result and a second labeled result. Next, the deciding unit compares the first labeled result with the second labeled result. When the first labeled result and the second labeled result are different, the outputting unit determines and outputs the correct labeled result. In this way, not only rapidly and accurately recognizing the correct labeled result is implemented, but also manually labeling is not needed in the whole process, thereby effectively improving the labeling efficiency.

In some optional implementations of this embodiment, the outputting unit 505 may further comprise a first determining module, an obstacle determining module, a labeled volume determining module, an expected volume range determining module and a first result determining module not shown in FIG. 5.

The first determining module is configured to determine a difference between the first labeled result obtained by the first labeling unit 502 and the second labeled result obtained by the second labeling unit 503.

The obstacle determining module is configured to determine a first obstacle in the first labeled result and a second obstacle in the second labeled result indicated by the same difference.

The labeled volume determining module is configured to determine a labeled volume determined by a three-dimensional coordinate set of the first obstacle and a first distance between the first obstacle and the lidar sensor in the first labeled result.

The expected volume range determining module is configured to determine, based on the first labeled result and the first distance, an expected volume range, in the point cloud data, of the first obstacle.

The first result determining module is configured to determine the first labeled result as being incorrect in response to the labeled volume being beyond the expected volume range.

In some optional implementations of this embodiment, the outputting unit 505 may further comprise a labeled pixel area determining module, a second distance determining module, an expected pixel area range determining module and a second result determining module not shown in FIG. 5.

The labeled pixel area determining module is configured to determine a labeled pixel area, covered by the second obstacle, in the second labeled result.

The second distance determining module is configured to determine a second distance between the second obstacle and the image capturing apparatus based on the first distance, and a calibration parameter between the lidar sensor and the image capturing apparatus.

The expected pixel area range determining module is configured to determine, based on the second labeled result and the second distance, an expected pixel area range, in the image data, of the second obstacle.

The second result determining module is configured to determine the second labeled result as being incorrect in response to the labeled pixel area being beyond the expected pixel area range.

In some optional implementations of this embodiment, the outputting unit 505 may further comprise a second determining module not shown in FIG. 5, configured to perform following steps in response to the labeled volume being within the expected volume range and the labeled pixel area being within the expected pixel area range: determining an actual volume, in the point cloud data, determined by the three-dimensional coordinate set of the first obstacle; projecting the actual volume into the image data to obtain an expected pixel area corresponding to the actual volume; deciding whether the labeled pixel area is equal to the expected pixel area; and determining the first labeled result as being correct when deciding that the labeled pixel area is not equal to the expected pixel area.

In some optional implementations of this embodiment, the second determining module may be further configured to determine the second labeled result as being correct when deciding that the second pixel area is equal to the expected pixel area.

In some optional implementations of this embodiment, the second determining module may be further configured to decide whether the labeled volume is equal to the actual volume, and determine the first labeled result as being correct when deciding that the labeled volume is equal to the actual volume.

In some optional implementations of this embodiment, the second determining module may be further configured to determine the second labeled result as being correct when deciding that the labeled volume is not equal to the actual volume.

In some optional implementations of this embodiment, the apparatus 500 for recognizing an obstacle to a vehicle may further comprise a first revising unit and a second revising unit not shown in FIG. 5.

The first revising unit is configured to revise the second labeled result based on the first labeled result in response to the first labeled result being correct, and use the revised second labeled result to retrain the image recognition model.

The second revising unit is configured to revise the first labeled result based on the second labeled result in response to the second labeled result being correct, and use the revised first labeled result to retrain the point cloud recognition model.

It should be appreciated that the units 501-505 recorded in the apparatus 500 for recognizing an obstacle to a vehicle respectively correspond to each step in the method described in FIG. 1. As thus, the operations and features described for the method for recognizing an obstacle to a vehicle are also adapted to the units comprised in the apparatus 500, and thus are not repeated any more herein. Corresponding units of the apparatus 500 may coordinate with units in the server to implement the solutions of the embodiments of the present disclosure.

Figure 6:
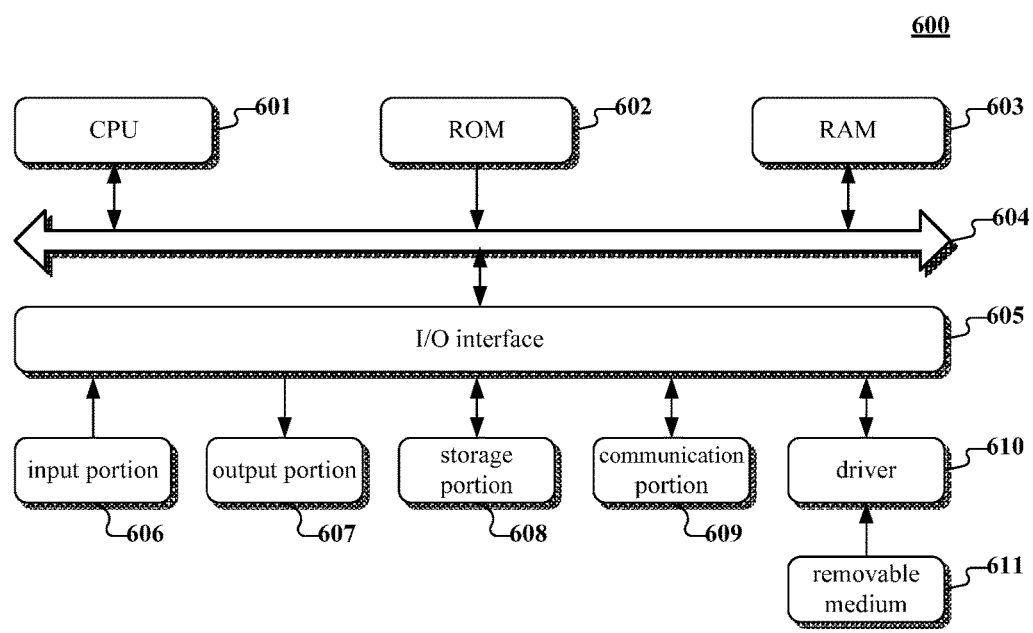
FIG. 6 illustrates a structural schematic diagram of a computer system adapted to implement a terminal device or a server of the embodiments of the present disclosure.

Referring to FIG. 6, a schematic structural diagram of a computer system 600 adapted to implement a terminal apparatus or a server of the embodiments of the present disclosure is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the CPU 601, implements the functions as defined by the methods of the present disclosure.

The flowcharts and block diagrams in the figures illustrate architectures, functions and operations that may be implemented according to the system, the method and the computer program product of the various embodiments of the present disclosure. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present disclosure may be implemented by way of software or hardware. The described units or modules may also be provided in a processor, for example, described as: a processor, comprising an acquiring unit, a first labeling unit, a second labeling unit, a deciding unit and an outputting unit, where the names of these units or modules are not considered as a limitation to the units or modules. For example, the receiving unit may also be described as "a unit for acquiring point cloud data of a target region by using the lidar sensor and acquiring image data of the target region by using the image capturing apparatus".

In another aspect, the present disclosure further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: acquire point cloud data of a target region by using the lidar sensor and acquiring image data of the target region by using the image capturing apparatus; recognize obstacle information in the point cloud data by using a preset point cloud recognition model, and label a recognition result to obtain a first labeled result; recognize obstacle information in the image data by using a preset image recognition model, and label a recognition result to obtain a second labeled result; compare the first labeled result with the second labeled result to decide whether the first labeled result and the second labeled result are identical; and determine a correct labeled result in the first labeled result and the second labeled result in response to the first labeled result being different from the second labeled result and outputting the correct labeled result.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A method for recognizing an obstacle to a vehicle, wherein the vehicle comprises a calibrated lidar sensor and an image capturing apparatus, and the method comprises:
   acquiring point cloud data of a target region by using the lidar sensor and acquiring image data of the target region by using the image capturing apparatus;
   recognizing obstacle information in the point cloud data by using a preset point cloud recognition model, and labeling a recognition result to obtain a first labeled result;
   recognizing obstacle information in the image data by using a preset image recognition model, and labeling a recognition result to obtain a second labeled result;
   comparing the first labeled result with the second labeled result to decide whether the first labeled result and the second labeled result are identical; and
   in response to deciding that the first labeled result and the second labeled result are not identical, determining a correct labeled result from the first labeled result and the second labeled result and outputting the correct labeled result.

2. The method according to claim 1, wherein the determining a correct labeled result from the first labeled result and the second labeled result comprises:
   determining a difference between the first labeled result and the second labeled result;
   determining a first obstacle in the first labeled result indicated by the difference and a second obstacle in the second labeled result indicated by the difference;
   determining a labeled volume determined by a three-dimensional coordinate set of the first obstacle and a first distance between the first obstacle and the lidar sensor in the first labeled result;
   determining an expected volume range of the first obstacle in the point cloud data based on the first labeled result and the first distance; and
   in response to the labeled volume being beyond the expected volume range, determining the first labeled result as being incorrect.

3. The method according to claim 2, wherein the determining a correct labeled result from the first labeled result and the second labeled result comprises:
   determining a labeled pixel area covered by the second obstacle in the second labeled result;
   determining a second distance between the second obstacle and the image capturing apparatus based on the first distance, and a calibration parameter between the lidar sensor and the image capturing apparatus;
   determining an expected pixel area range of the second obstacle in the image data based on the second labeled result and the second distance; and
   in response to the labeled pixel area being beyond the expected pixel area range, determining the second labeled result as being incorrect.

4. The method according to claim 3, wherein the determining a correct labeled result from the first labeled result and the second labeled result comprises:

in response to the labeled volume being within the expected volume range and the labeled pixel area being within the expected pixel area range, performing following steps:

determining an actual volume determined by the three-dimensional coordinate set of the first obstacle in the point cloud data;

projecting the actual volume into the image data to obtain an expected pixel area corresponding to the actual volume;

deciding whether the labeled pixel area is equal to the expected pixel area; and determining the first labeled result as being correct when deciding that the labeled pixel area is not equal to the expected pixel area.

5. The method according to claim 4, wherein the determining a correct labeled result from the first labeled result and the second labeled result comprises:

determining the second labeled result as being correct when deciding that the second pixel area is equal to the expected pixel area.

6. The method according to claim 4, wherein the determining a correct labeled result from the first labeled result and the second labeled result comprises:

deciding whether the labeled volume is equal to the actual volume; and determining the first labeled result as being correct when deciding that the labeled volume is equal to the actual volume.

7. The method according to claim 4, wherein the determining a correct labeled result from the first labeled result and the second labeled result comprises:

determining the second labeled result as being correct when deciding that the labeled volume is not equal to the actual volume.

8. The method according to claim 1, further comprising at least one of:

in response to the first labeled result being correct, revising the second labeled result based on the first labeled result and retraining the image recognition model by using the revised second labeled result; and in response to the second labeled result being correct, revising the first labeled result based on the second labeled result and retraining the point cloud recognition model by using the revised first labeled result.

9. An apparatus for recognizing an obstacle to a vehicle, wherein the vehicle comprises a calibrated lidar sensor and an image capturing apparatus, and the apparatus comprises:

at least one processor; and a memory storing instructions, which when executed by the at least one processor, cause the at least one processor to perform operations, the operations comprising:

acquiring point cloud data of a target region by using the lidar sensor and acquire image data of the target region by using the image capturing apparatus;

recognizing obstacle information in the point cloud data by using a preset point cloud recognition model, and label a recognition result to obtain a first labeled result;

recognizing obstacle information in the image data by using a preset image recognition model, and label a recognition result to obtain a second labeled result;

deciding whether the first labeled result and the second labeled result are identical by comparing the first labeled result with the second labeled result; and in response to deciding that the first labeled result and the second labeled result are not identical, determining a correct labeled result from the first labeled result and the second labeled result.

10. The apparatus according to claim 9, the operations further comprising:

determining a difference between the first labeled result and the second labeled result;

determining a first obstacle in the first labeled result indicated by the difference and a second obstacle in the second labeled result indicated by the difference;

determining a labeled volume determined by a three-dimensional coordinate set of the first obstacle and a first distance between the first obstacle and the lidar sensor in the first labeled result;

determining an expected volume range of the first obstacle in the point cloud data based on the first labeled result and the first distance; and in response to the labeled volume being beyond the expected volume range, determining the first labeled result as being incorrect.

11. The apparatus according to claim 10, the operations further comprising:

determining a labeled pixel area covered by the second obstacle in the second labeled result;

determining a second distance between the second obstacle and the image capturing apparatus based on the first distance, and a calibration parameter between the lidar sensor and the image capturing apparatus;

determining an expected pixel area range of the second obstacle in the image data based on the second labeled result and the second distance; and in response to the labeled pixel area being beyond the expected pixel area range, determining the second labeled result as being incorrect.

12. The apparatus according to claim 11, the operations further comprising:

in response to the labeled volume being within the expected volume range and the labeled pixel area being within the expected pixel area range, performing following steps:

determining an actual volume determined by the three-dimensional coordinate set of the first obstacle in the point cloud data;

projecting the actual volume into the image data to obtain an expected pixel area corresponding to the actual volume;

deciding whether the labeled pixel area is equal to the expected pixel area; and determining the first labeled result as being correct when deciding that the labeled pixel area is not equal to the expected pixel area.

13. The apparatus according to claim 12, the operations further comprising:

determining the second labeled result as being correct when deciding that the second pixel area is equal to the expected pixel area.

14. The apparatus according to claim 12, the operations further comprising:

deciding whether the labeled volume is equal to the actual volume; and determining the first labeled result as being correct when deciding that the labeled volume is equal to the actual volume.

15. The apparatus according to claim 14, the operations further comprising:
   determining the second labeled result as being correct when deciding that the labeled volume is not equal to the actual volume.

16. The apparatus according to claim 9, the operations further comprising at least one of:
   in response to the first labeled result being correct, revising the second labeled result based on the first labeled result and retrain the image recognition model by using the revised second labeled result; and
   in response to the second labeled result being correct, revising the first labeled result based on the second labeled result and retrain the point cloud recognition model by using the revised first labeled result.

17. A non-transitory computer storage medium storing a computer program, which when executed by one or more processors, cause the one or more processors to perform operations for recognizing an obstacle to a vehicle, wherein the vehicle comprises a calibrated lidar sensor and an image capturing apparatus, and the operations comprises:
   acquiring point cloud data of a target region by using the lidar sensor and acquiring image data of the target region by using the image capturing apparatus;
   recognizing obstacle information in the point cloud data by using a preset point cloud recognition model, and labeling a recognition result to obtain a first labeled result;
   recognizing obstacle information in the image data by using a preset image recognition model, and labeling a recognition result to obtain a second labeled result;
   comparing the first labeled result with the second labeled result to decide whether the first labeled result and the second labeled result are identical; and
   in response to deciding that the first labeled result and the second labeled result are not identical, determining a correct labeled result from the first labeled result and the second labeled result and outputting the correct labeled result.

* * * * *